United States Patent

Utagawa

Patent Number: 4,460,260
Date of Patent: Jul. 17, 1984

[54] FOCUS DETECTING DEVICE

[75] Inventor: Ken Utagawa, Tokyo

[73] Assignee: Nippon Kogaku K.K., Tokyo, Japan

[21] Appl. No.: 469,771

[22] Filed: Feb. 25, 1983

[30] Foreign Application Priority Data

Mar. 4, 1982 [JP] Japan .................. 57-34368

[51] Int. Cl.³ .................. G03B 3/00; G03B 13/18
[52] U.S. Cl. ............................ 354/406; 250/201
[58] Field of Search ............... 354/400, 402, 406; 250/201

[56] References Cited

U.S. PATENT DOCUMENTS 4,310,227 1/1982 Zinchuk .................. 354/402

Primary Examiner—Russell E. Adams
Attorney, Agent, or Firm—Fitzpatrick, Cella, Harper & Scinto

[57] ABSTRACT

A focus detecting device for detecting the focus position of an image forming system comprises plural arrays of small lenses, plural units of photoelectric elements respectively corresponding to the small lenses of the lens arrays and a synthesizing device. Each of the arrays includes plural small lenses arranged in a predetermined direction in the vicinity of a focal plane of the image forming system and the plural lens arrays are positioned mutually parallel. Each of the plural units of photoelectric elements is positioned behind the corresponding one of the small lenses. The synthesizing device synthesizes photoelectric output signals from the units of photoelectric element behind the positionally corresponding small lenses belonging to the plural lens arrays.

10 Claims, 33 Drawing Figures

FOCUS DETECTING DEVICE

BACKGROUND OF THE INVENTION

1. Field of the Invention

The present invention relates to a focus detecting device of an image forming optical system for use in cameras or other optical instruments.

2. Description of the Prior Art

U.S. Pat. No. 4,185,191 discloses a device for detecting the focus state by measuring the light transmitted by an objective lens of a camera, as is schematically shown in FIGS. 1A-1C. Referring to FIG. 1A, there is provided an array 2 of small lenses in the vicinity of a supposed focal plane of an objective lens 1, and behind the small lens array 2 there is positioned an array 3 of photoelectric elements. As shown in FIGS. 1B and 1C, the small lens array 2 comprises a linear arrangement of small lenses 4, 5, . . . with a determined interval d, and the photoelectric element array 3 is composed of pairs of photoelectric elements (4a, 4b), (5a, 5b), . . . respectively positioned behind the associated small lenses 4, 5, . . . . The direction of arrangement of the small lenses 4, 5, . . . will be called direction x, and the normal direction thereto will be called direction y.

The paired photoelectric elements (4a, 4b), (5a, 5b) . . . are arranged along the direction x, and, in FIG. 1B, the upper ones 4a, 5a, . . . of the paired photoelectric elements receive the light passing through a lower part of the exit pupil of the objective lens 1, while the lower ones 4b, 5b, . . . of the photoelectric elements receive the light passing through an upper part of the exit pupil. A focus detecting circuit 6 detects the relative displacement between the photoelectric output pattern of a first photoelectric element group consisting of the upper elements 4a, 5a, . . . and that of a second photoelectric element group consisting of the lower elements 4b, 5b, . . ., thereby identifying whether the objective lens 1 is in a front-focus state in which the image formed by the objective lens is positioned in front of the supposed focal plane, an in-focus state, or a rear-focus state in which said image is positioned behind the supposed focal plane.

Although not explicitly disclosed in the above-mentioned U.S. Patent specification, automatic focusing can be achieved by controlling a motor 8 with the focus detection signal from the focus detecting circuit 6 through a control circuit 7 to displace the objective lens 1 along the optical axis by means of a lens moving mechanism 9.

The known focus detecting device described above is, however, associated with the following drawback. The optical image formed on the lens array 2 by the objective lens 1 is divided by the small lenses 4, 5, . . . and converted into photoelectric output signals by the photoelectric elements 4a, 4b, 5a, 5b, . . . . The modulation transfer function (MTF), which is determined by the shape of the small lenses 4, 5, . . . has a characteristic as shown by a solid line A in FIG. 2, and is designed to extract the spatial frequency components close to or lower than a spatial frequency 1/d, wherein d is the pitch of the small lenses. However, as already known from the sampling theory, spatial frequency components higher than Nyquist frequency $f_N = 1/2d$ do not function as effective information, but cause instability or error in the detection of relative displacement between the photoelectric output patterns of said first and second photoelectric element groups. More specifically, let us consider the spatial frequencies $f_N - f$ and $f_N + f$ ($0 < f < f_N$) symmetrical to the Nyquist frequency $f_n$. A movement of a spatial lattice image of the former spatial frequency $f_N - f$ in the direction x along the lens array 2 causes a movement of the photoelectric output pattern in the same direction, but a movement of a spatial lattice image of the latter spatial frequency $f_N + f$, namely a frequency higher than the Nyquist frequency, in the direction x causes a movement of the photoelectric output pattern in the opposite direction. Consequently, if the optical image contains a relatively large amount of spatial frequency components exceeding the Nyquist frequency $f_N$, a significant error is inevitably involved in the focus detection derived from the output patterns of the first and second photoelectric element groups.

SUMMARY OF THE INVENTION

The object of the present invention, therefore, is to provide a focus detecting device capable of suppressing spatial frequency components higher than the Nyquist frequency, thereby enabling focus detection of a higher precision.

DETAILED DESCRIPTION OF THE PREFERRED EMBODIMENTS

Now the present invention will be clarified in detail by the following description of preferred embodiments taken in conjunction with the attached drawings.

Figure 4:
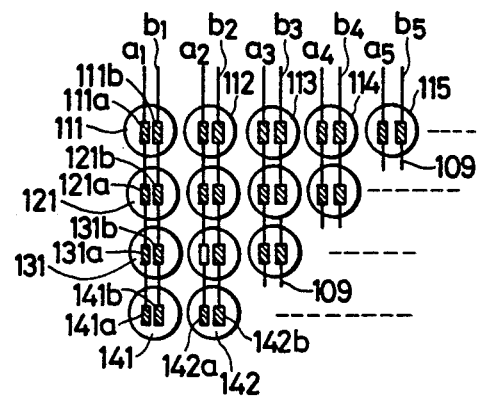
FIG. 4 is a front view showing the array of small lenses and the photoelectric elements shown in FIG. 3.
Figure 3:
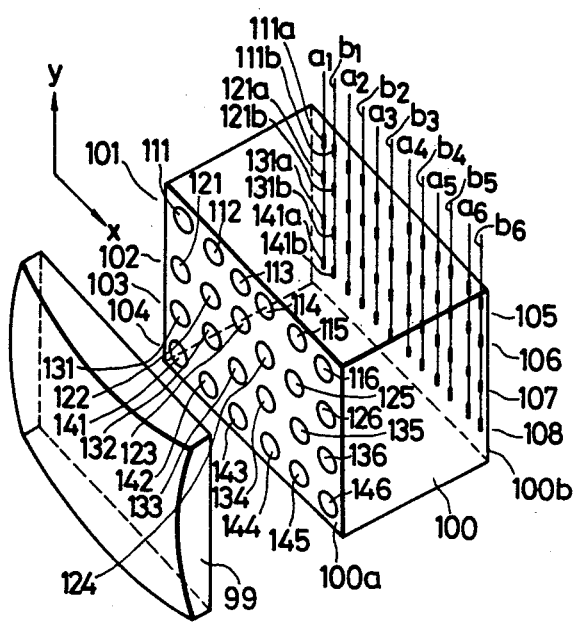
FIG. 3 is a perspective view showing an embodiment of the present invention.

Referring to FIG. 3, a field lens 99 is positioned behind the objective lens, and immediately behind the field lens 99 there is provided a rectangular transparent block 100. A face 100a of the block 100 facing the field lens 99 is positioned at or in the vicinity of a supposed focal plane of the objective lens, and is provided with a first small lens array 101 composed of small convex lenses 111-116; a second small lens array 102 composed of small convex lenses 121-126; a third small lens array 103 composed of small convex lenses 131-136; and a fourth small lens array 104 composed of small convex lenses 141-146. On an opposite face 100b of the block 100, there are provided first, second, third and fourth arrays 105, 106, 107, 108 of photoelectric elements, which respectively correspond to the lens arrays 101, 102, 103, 104 and are composed, for example, of charge-coupled devices (CCD). The relationship between the small lenses in the lens arrays 101-104 and the photoelectric elements in the corresponding photoelectric element arrays 105-108 is, as shown in FIG. 4, the same as that shown in FIGS. 1A-1C, so that each of small lenses 111, . . . corresponds to a pair of photoelectric elements (111a, 111b), . . . . Corresponding ones of paired photoelectric elements of the positionally corresponding small lenses, for example, 111, 121, 131, 141, of the lens arrays 101-104 are mutually connected by a conductor 109. For example the photoelectric elements 111a, 121a, 131a and 141a are serially connected, and the photoelectric elements 111b, 121b, 131b and 141b are likewise serially connected. Consequently, an output terminal a1 provides an output signal synthesized from the photoelectric output signals of the photoelectric elements 111a, 121a, 131a and 141a, while an output terminal b1 provides an output signal synthesized from the output signals of the photoelectric elements 111b, 121b, 131b and 141b, and other output terminals a2, b2, . . . , a6, b6 likewise provide similar synthesized output signals. The synthesized output signals from the output terminals a1 b1, . . . , a6, b6 are processed to obtain the focus detection signal in the same manner as in the photoelectric element array shown in FIG. 1A. The parallel arrangement of plural lens arrays in the direction y and the synthesis of output signals of the photoelectric elements of the positionally corresponding small lenses belonging to different lens arrays in the above-described manner enable the frequency components exceeding the Nyquist frequency to be relatively suppressed as will be explained in detail later.

Figure 5:
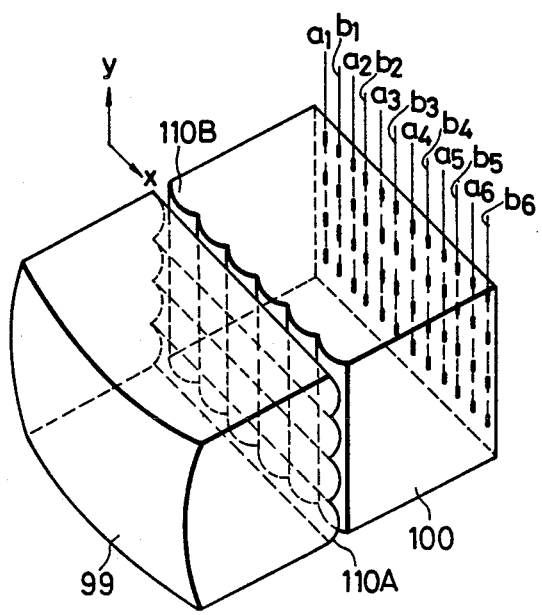
FIG. 5 is a perspective view showing another embodiment of the present invention.

The small lenses described in the foregoing are not necessarily limited to mutually independent circular lenses as shown in FIG. 3, but may be replaced, as shown in FIG. 5 by an array of cylindrical lenses 110A formed on a face of the field lens 99 and an array of cylindrical lenses 110B normal to the lens array 100A formed on a face 100a of the transparent block 100.

FIGS. 6 to 12 show other embodiments of the present invention in which the two-dimensional arrangement of the small lens arrays are modified.

Figure 6:
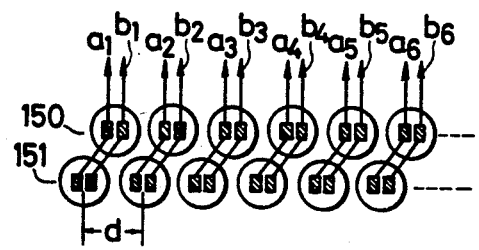
FIGS. 6 to 12 are front views showing other arrangements of small lenses in the lens array.
Figure 7:
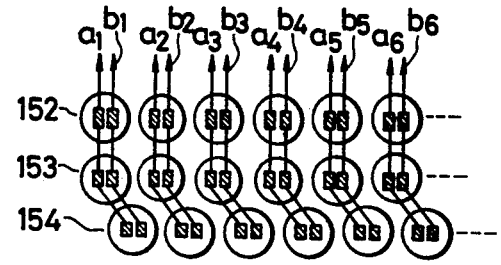

In an embodiment shown in FIG. 6, the first lens array 150 and the second lens array 151 are mutually displaced by a half pitch d/2, or by a phase difference of 180°, and the photoelectric elements of positionally corresponding lenses in the first and second lens arrays are mutually connected. In an embodiment shown in FIG. 7, the first and second lens arrays 152, 153 are in the same phase, but the third lens array 154 is positioned with a phase difference of 180° with respect to the first lens array 152. In an embodiment shown in FIG. 8, the first and third lens arrays 155, 157 are in the same phase, but the second lens array 156 is positioned with a phase difference of 180°. In an embodiment shown in FIG. 9, the first and second lens arrays 158, 159 are in the same phase, but the third and fourth lens arrays 160, 161 are positioned with a phase difference of 180°. In an embodiment shown in FIG. 10, the first and fourth lens arrays 162, 165 are in the same phase, but the second and third lens arrays 163, 164 are positioned with a phase difference of 180°. In an embodiment shown in FIG. 11, the first and third lens arrays 166, 168 are in the same phase, but the second and fourth lens arrays 167, 169 are positioned with a phase difference of 180°. In an embodiment shown in FIG. 12, the first and third lens arrays 170, 172 are in the same phase, but the second lens array 171 is positioned with a phase difference of 180°, wherein said second lens array 171 has smaller lenses than those in the first and third lens arrays 170, 172. As represented in this embodiment, the diameter of the small lenses may be selected differently for each lens array.

Figure 8:
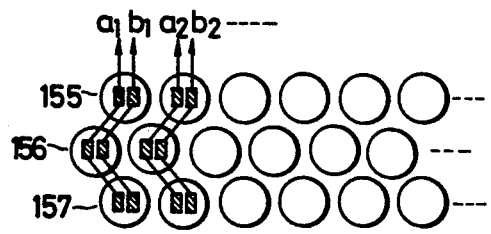
Figure 9:
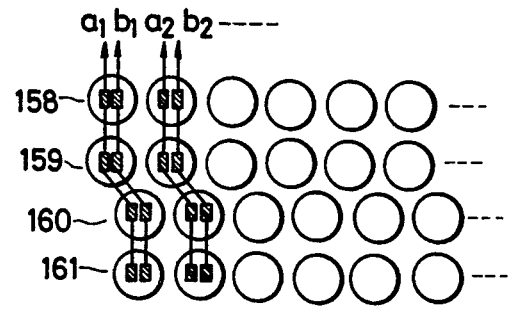
Figure 10:
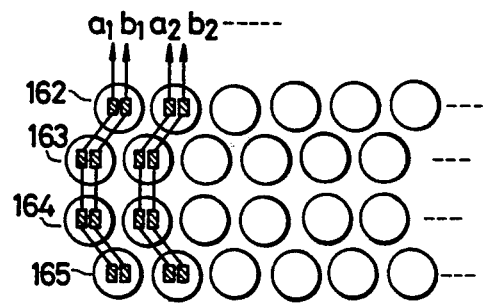
Figure 11:
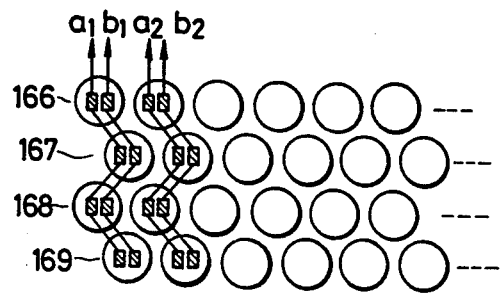
Figure 12:
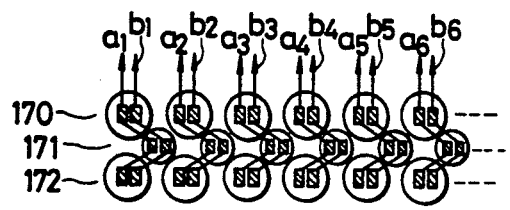
Figure 13A:
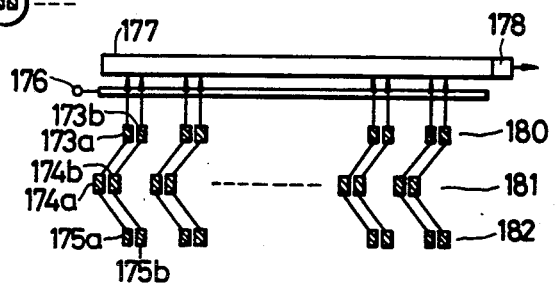
FIGS. 13A and 13B are schematic views showing a circuit for obtaining output signals from the photoelectric elements.

Now there will be given an explanation of the structure of a readout part of the photoelectric output, for example, in case of the photoelectric element arrays shown in FIG. 8. As shown in FIG. 13A, the synthesized output signals from the serially connected photoelectric elements (173a, 174a, 175a), (173b, 174b, 175b,), . . . are supplied through a transfer gate 176 to a CCD transfer unit 177, and released through an output amplifier 178. Switching means such as the transfer gate 176 may be provided not only between the first photoelectric element array 180 and the CCD unit 177 but also between the first and second photoelectric element arrays 180, 181 and/or between the second and third arrays 181, 182. In this it is rendered possible to synthesize the output signals of the first and second arrays or to synthesize the output signals of all three arrays, through suitable control of the transfer gates.

The synthesis of photoelectric output signals of the positionally corresponding photoelectric elements in plural small lens arrays can also be achieved, instead of the direct connection of the photoelectric elements by conductive members as explained in the foregoing, by the addition of the photoelectric output signals obtained from the photoelectric elements. This construction is shown in FIG. 13B.

Figure 13B:
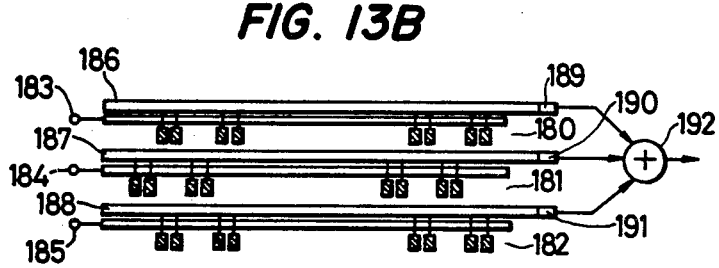

In an embodiment shown in FIG. 13B, the output signals of the first, second and third photoelectric element arrays 180, 181, 182 are respectively supplied, through respectively corresponding transfer gates 183, 184, 185, to transfer units 186, 187, 188, which output signals are supplied through output amplifiers 180, 190, 191 to an adder 192 and added therein.

Figure 14:
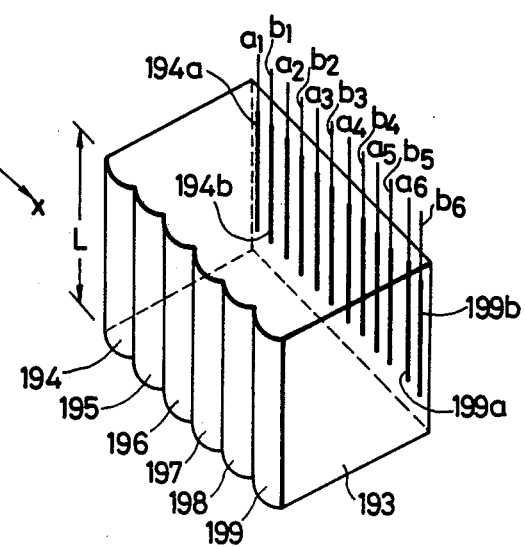
FIG. 14 is a perspective view showing another embodiment of the present invention.

Now reference is made to FIG. 14 showing another embodiment of the present invention, in which a transparent block 193 is provided, on a face thereof, with mutually parallel cylindrical lenses 194-199 arranged in the direction x, and, on an opposite face, with plural pairs of photoelectric elements (194a, 194b), ..., (199a, 199b), each pair being opposed to the cylindrical lens corresponding thereto. The photoelectric elements extend in the direction y and have a length substantially equal to the length L of the cylindrical lenses. In this embodiment, the spatial frequency components exceeding the Nyquist frequency can be sufficiently suppressed if the length L of the cylindrical lenses is selected to be larger than a spatial interval $l_N$ corresponding to the Nyquist frequency $f_N$.

Figure 1A:
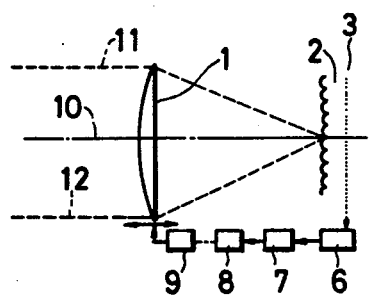
FIG. 1A is a schematic view showing an optical system of a conventional focus detecting device.
Figure 1B:
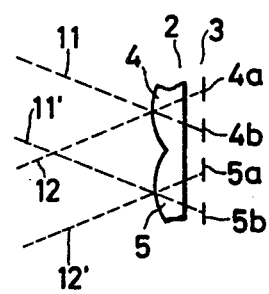
FIGS. 1B and 1C are a cross-sectional view and a front view respectively showing the relationship between the array of small lenses and the photoelectric elements shown in FIG. 1A.
Figure 1C:
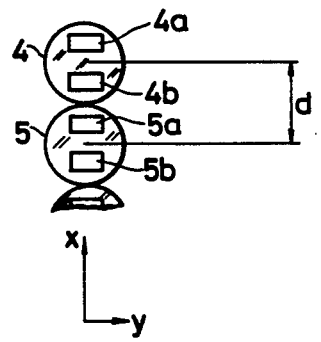
Figure 2:
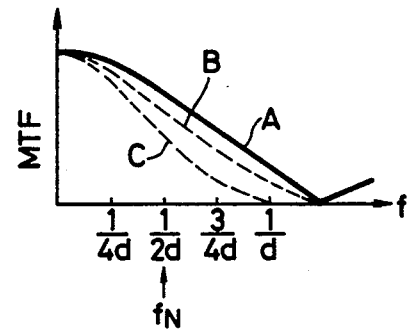
FIG. 2 is a chart showing characteristics of modulation transfer functions.

It will now be explained, with reference to FIGS. 15 to 18, that the focus detecting device of the present invention, as described in the foregoing, is capable of relatively suppressing the spatial frequency components exceeding the Nyquist frequency $f_N$ in comparison with the conventional device shown in FIGS. 1A to 1C.

Figure 15A:
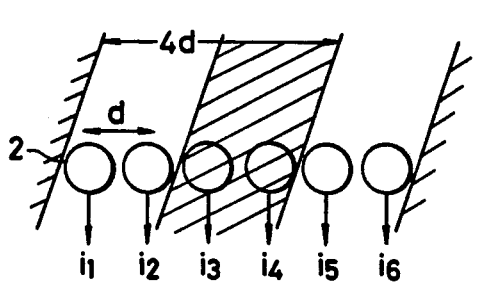
FIG. 15A is a front view showing an optical image projected on a conventional lens array.
Figure 17A:
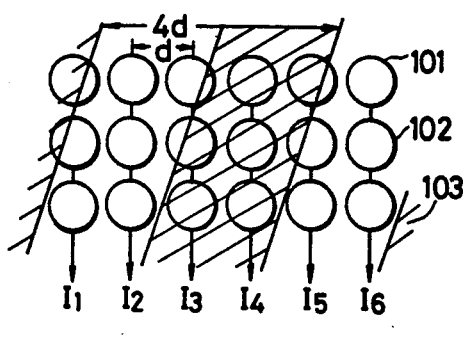
FIG. 17A is a front view showing an optical image projected on an array of small lenses according to the present invention.
Figure 15B:
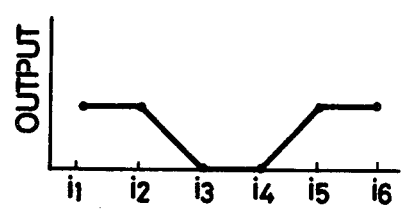
FIG. 15B is a chart showing photoelectric output signals in the state of FIG. 15A.
Figure 17B:
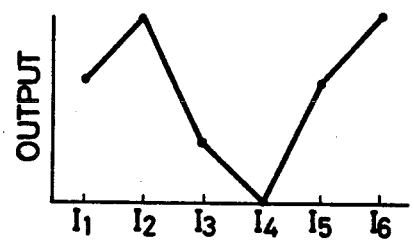
FIG. 17B is a chart showing the photoelectric output signals in the state of FIG. 17A.
Figure 16A:
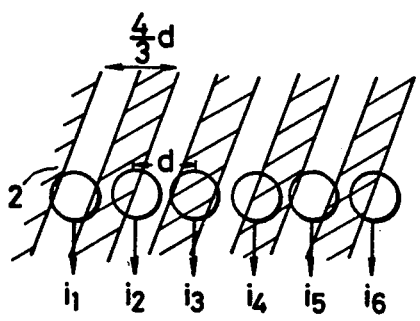
FIGS. 16A and 16B are a view and a chart respectively similar to FIGS. 15A and 15B.
Figure 18A:
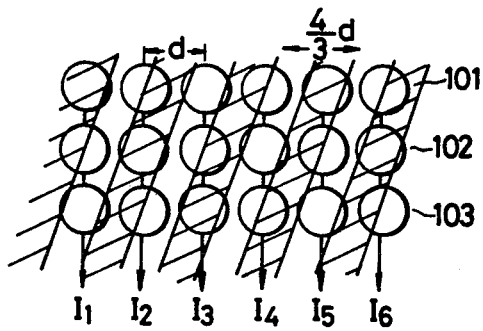
FIGS. 18A and 18B are a view and a chart respectively similar to FIGS. 17A and 17B.
Figure 16B:
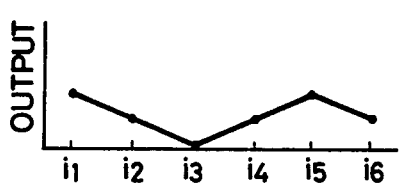
Figure 18B:
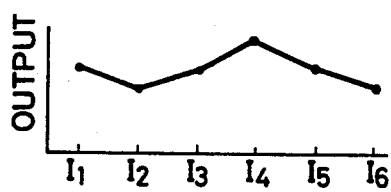

FIGS. 15A and 16A respectively show spatial lattice images (represented by hatched areas) of spatial frequencies of $1/(4d)$ and $3/(4d)$ projected on a conventional lens array 2, and FIGS. 15B and 16B respectively show the photoelectric output signals i1-i6 obtained from either ones of the paired photoelectric elements positioned behind the small lenses shown in FIGS. 15A and 16A. Also FIGS. 17A and 18A respectively show spatial lattice images (represented by hatched areas) of spatial frequencies of $1/(4d)$ and $3/(4d)$ projected on the first, second and third lens arrays 101, 102, 103 two-dimensionally arranged according to the present invention, and FIGS. 17B and 18B show the corresponding photoelectric output signals I1-I6 of FIGS. 17A and 18A, respectively, which correspond to the synthesized output signals a1-a6 or b1-b6 shown in FIG. 3. In case of the projection of the spatial lattice image of a spatial frequency $1/(4d)$ smaller than the Nyquist frequency $f_N = 1/(2d)$, the peak-to-peak amplitude of the photoelectric output pattern I1-I6 show in FIG. 17B, being obtained by the synthesis of the output signals of the first, second and third arrays, is approximately three times as great as that of the output pattern i1-i6 shown in FIG. 15B. In this manner, the photoelectric output signals I1-I6 obtained from the focus detecting device of the present invention contain, in comparison with the output signals i1-i6 obtained from the conventional device, a larger amount of the spatial frequency components below the Nyquist frequency, which components can be effectively utilized for detecting the focus state. On the other hand, in case of the projection of the spatial lattice image of a spatial frequency $3/(4d)$ exceeding the Nyquist frequency $1/(2d)$, the amplitude of the photoelectric output pattern I1-I6 shown in FIG. 18B is comparable to that shown in FIG. 16B. As will be understood from the foregoing exemplification, the focus detecting device of the present invention has, in comparison with the conventional device, a relatively lower efficiency of extracting the spatial frequency components higher than the Nyquist frequency and a relatively higher efficiency of extracting the spatial frequency components lower than the Nyquist frequency. Although the foregoing explanation has been given with respect to a particular arrangement in which the first, second and third lens arrays are arranged in the same phase, similar results are obtained from the arrangements of the lens arrays involving a phase difference as shown in FIGS. 6 to 12.

The effect of the present invention, for suppressing the extraction of the higher spatial frequency components, which has been explained in the foregoing by a particular example, will be further clarified by the following general explanation.

Statistically, an object pattern showing a short spatial pitch in the direction x of the arrangement of the small lenses also shows a short spatial pitch in the perpendicular direction y, and the same when the spatial pitch is long. Consequently, a structure of elongating the light receiving portions in the direction y, either by employing plural lens arrays and synthesizing the output signals of the photoelectric elements arranged along the direction y, or by employing cylindrical lenses extending in the direction y and likewise extended photoelectric elements as shown in FIG. 14, suppresses the relatively high spatial frequency components through a high probability of mutual compensation of such components with respect to the direction y, thereby emphasizing the lower spatial frequency components. The above-mentioned light receiving portion represents the sum of apertures of positionally corresponding small lenses belonging to plural lens arrays, or the aperture of each cylindrical lens shown in FIG. 14.

The optimum length of said light receiving portion in the direction y varies according to the illumination distribution pattern of an optical image to be detected, but is preferably selected, in general, within a range from about a length $l_N$ to about a length $3l_N$, wherein $l_N$ is a spatial pitch corresponding to the Nyquist frequency $f_N$ and is defined by $l_N = 1/f_N$.

The lower limit $l_N$ of the length of said light receiving portion is determined in consideration of relatively suppressing the spatial frequency components above the Nyquist frequency in comparison with those below the Nyquist frequency for a random optical image in which the illumination pattern thereof is relatively isotropic. Also in order to suppress the components above the Nyquist frequency for an optical image in which the illumination distribution is uniform over a wide range in the direction y, such as a frequently encountered image with pattern of stripes elongated in the direction y, the length of the light receiving portion in the direction y should be selected so as to be larger. However, the light receiving portion elongated significantly in excess of the above-mentioned upper limit $3l_N$ in the direction y will suppress even the spatial frequency components below the Nyquist frequency in case of the random optical image mentioned above. Consequently, the optimum length of the light receiving portion in the direction y varies according to the illumination distribution of the optical image and becomes larger as the illumination of the optical image becomes more uniform in the direction y.

The Nyquist frequency $f_N$ is equal to $1/(2d)$ as explained above in case of sampling all the output signals from the photoelectric elements and calculating the focus state from such sampled output signals, but it becomes equal to $1/(2 \times q \times d)$ in case the photoelectric output signals are sampled at every q-th photoelectric element, i.e. with an interval of $q \times d$.

Figure 19:
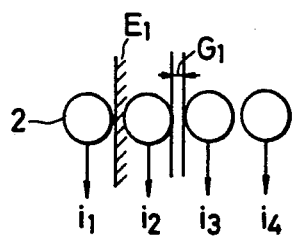
FIG. 19 is a front view showing a conventional lens array and an edge of the optical image projected thereon.
Figure 20:
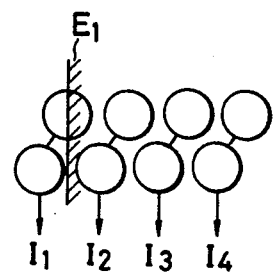
FIG. 20 is a front view showing a lens array of the present invention and an edge of the optical image projected thereon.
Figure 21A:
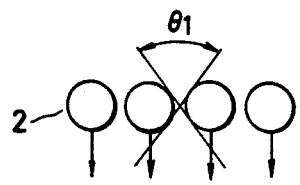
FIG. 21A is a front view showing a dead zone in the conventional lens array.
Figure 21C:
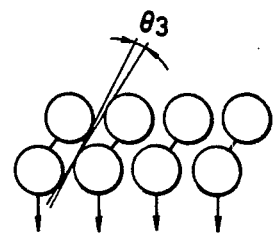
FIGS. 21B to 21D are front views respectively showing dead zones in the lens array of the present invention.
Figure 21B:
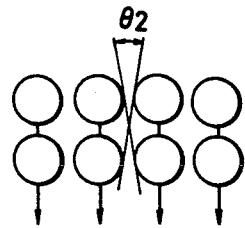
Figure 21D:
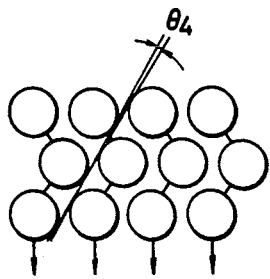

Now reference is made to FIGS. 19 to 21 for explaining another effect of the present invention.

FIG. 19 shows a state in which an edge E1 of a hatched optical image is positioned in a gap G1 between neighboring small lenses of the conventional lens array 2. The photoelectric output pattern i1-i4 does not show any change even if the edge E1 moves within said gap G1. Consequently, such conventional focus detecting device is associated with a drawback of being incapable of detecting the movement of the edge E1 within the gap G1. The gap seves as a dead zone in which the edge movement can not be detected. This drawback is eliminated in the focus detecting device of the present invention. In case the lens arrays are positioned with a phase difference of 180° according to the present invention as shown in FIG. 20, the edge E1 of the optical image always lies on either one of the small lenses regardless of the edge position on the lens array, so that any movement of said edge E1 always causes a change in the photoelectric output pattern I1-I4 and can therefore be detected.

In FIG. 19, the edge E1 is parallel to the direction y, but the undesirable effect of the gap G1 can be prevented if the edge E1 is inclined to the direction y in such a manner that said edge covers two adjacent small lenses. FIG. 21 shows the inclination of the edge E1 required for avoiding the undesirable effect of the gap G1. In a conventional lens array shown in FIG. 21A, a dead zone exists for an edge present in an angular range $\theta 1$. In the lens array of the present invention shown in FIGS. 21B, 21C or 21D, there exists a dead zone for an edge present in an angular range $\theta 2$, $\theta 3$ or $\theta 4$ which is significantly smaller than the aforementioned angular range $\theta 1$. This fact indicates that the lens array of the present invention does not show a dead zone for any edge slightly inclined to the direction y.

The focus detecting device utilizing a lens array is further associated with a following drawback.

The curvature of the field lens 99 shown in FIG. 3 or 5 is so determined that the images of the photoelectric elements formed by the small lenses substantially overlap one another on the exit pupil of the objective lens 1. However, for example in a single-lens reflex camera, there are provided plural interchangeable objective lenses of which the positions of the exit pupil are significantly different on the optical axis of the objective lens. Consequently, the position of said images of the photoelectric elements may be considerably different from the position of the exit pupil for certain interchangeable objective lenses. Such positional difference may result in an eclipse of the object image at the end portions of the lens array, thereby significantly deteriorating the precision of the focus detection.

Now there will be given an explanation of another embodiment of the present invention capable of resolving the above-mentioned drawback.

Figure 22:
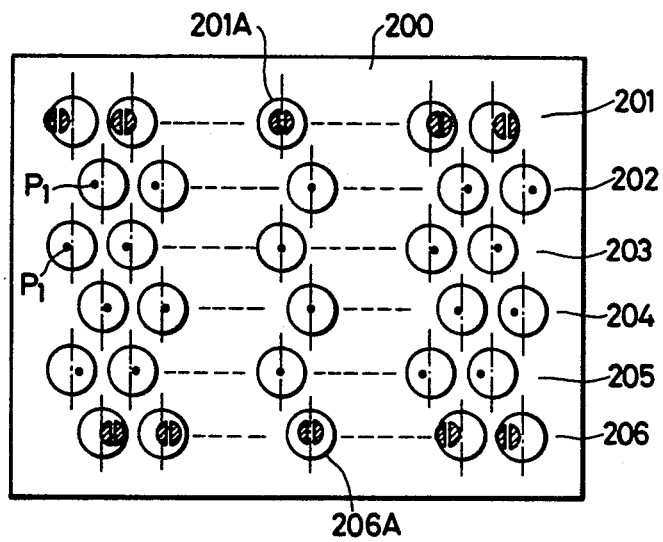
FIG. 22 is a front view of another lens array of another embodiment of the present invention.

In FIG. 22, the first to sixth lens arrays 201-206 are formed in the same manner as shown in FIG. 3 on a transparent block 200 positioned behind the field lens. The first, third and fifth lens arrays 201, 203, 205 are positioned in the same phase, while the second, fourth and sixth lens arrays 202, 204, 206 are positioned with a phase difference of 180° with respect to the first lens array 201. The positional relationship between each lens in each lens array and each corresponding pair of photoelectric elements are determined in the following manner. In the first lens array 201, a pair of photoelectric elements (illustrated by hatched areas) corresponding to a central small lens 201A is positioned symmetrical to the optical axis of said central small lens 201A, but other pairs of photoelectric elements are displaced toward the outside with respect to the optical axes of the corresponding small lenses, and the amount of said displacement is made gradually larger as the distance from the central small lens 201A becomes larger. In the sixth lens array 206, a pair of photoelectric elements corresponding to a central small lens 206A is positioned symmetrical to the optical axis of said central small lens 206A, but other pairs of photoelectric elements are displaced toward the inside namely, toward the central small lens 206A with respect to the optical axes of the corresponding small lenses, and the amount of said displacement is made gradually larger as the distance from the central small lens 206A increases. In the second to fifth lens arrays 202-205, for the purpose of simplicity, each pair of photoelectric elements is represented by a central point P1 of said pair. As will be understood from the positions of said points P1 with respect to the corresponding small lenses, the paired photoelectric elements in the second and third lens arrays 202, 203 are gradually displaced outward with respect to the optical axes of the corresponding small lenses as the distance from the center of the array increases in the same manner as in the first lens array. The amount of said displacement is selected so as to be largest in the first lens array 201 and smallest in the third lens array 203. On the other hand, in the fourth and fifth lens arrays 204, 205, the paired photoelectric elements are displaced inwardly with respect to the optical axes of the corresponding small lenses as the distance from the center of the array increases in the same manner as in the sixth lens array 206, and the amount of said displacement is selected so as to be largest in the sixth lens array and smallest in the fourth lens array.

In this manner, the position of each pair of photoelectric elements is displaced a greater amount from the center of the corresponding small lens as the distance from the center of the array increases, and the amount of said displacement is selected different for each lens array. Consequently, the axial position of the overlapping images of the photoelectric elements formed by the small lenses and by the field lens is made different for each lens array. More specifically, the position of the overlapping images of the photoelectric elements of the first lens array 201 is closest to the lens arrays, while those corresponding to the second to fifth lens arrays are farther from the lens arrays and that corresponding to the sixth lens array is farthest from the lens arrays. If all the small lenses have the same power, some of the images of the photoelectric elements are naturally out of focus, but the amount of defocus is generally negligibly small. In order to avoid such defocusing, it is necessary to regulate the power of the small lenses for each lens array, for example by changing the curvature of said small lenses.

The aforementioned drawback resulting from the significant positional difference between the exit pupil of the objective lens and the overlapping images of the photoelectric elements can be prevented by selecting, either manually or automatically, a lens array of which the position of the overlapping images of the photoelectric elements is closest to the position of the exit pupil of the mounted objective lens. The above-mentioned automatic selection can be achieved by providing each objective lens with a signal indicating the position of the exit pupil of said lens and by selecting the photoelectric output signals of a lens array corresponding to said indicating signal received upon the mounting of said lens onto the camera.

It is also possible to adjust the position of said overlapping images of the photoelectric elements by providing a field lens for each of the small lens arrays, such of said field lenses having different power, namely curvature instead of modifying the relative position of the lens array and the corresponding paired photoelectric elements.

Figure 23:
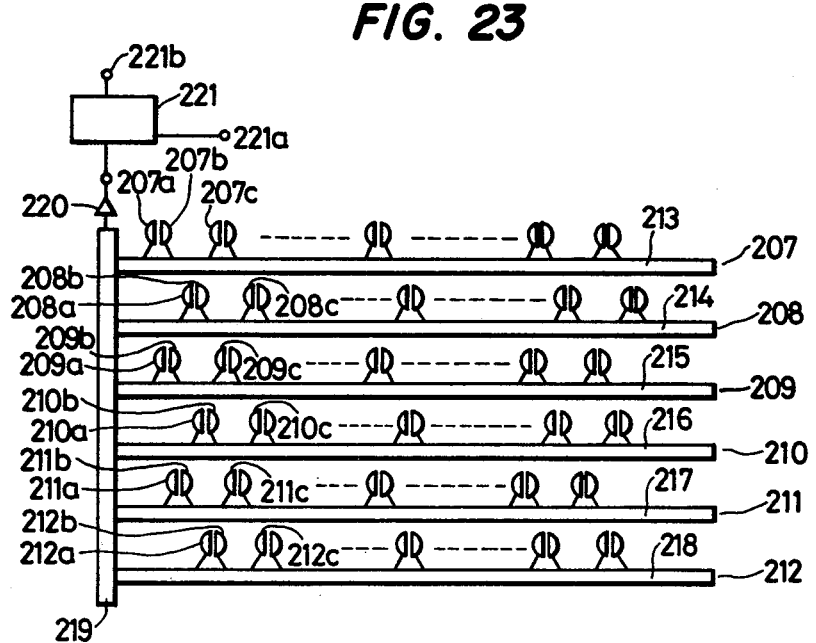
FIG. 23 is a schematic view showing a circuit for obtaining output signals from the photoelectric elements shown in FIG. 22.

Now reference is made to FIG. 23 showing a processing circuit for the photoelectric output signals from the first to sixth lens arrays 201-206.

In FIG. 23, the first to sixth photoelectric element arrays 207-212 respectively correspond to the lens arrays 201-206 shown in FIG. 22, wherein the photoelectric output signals or charges of said photoelectric element arrays are transferred in parallel form respectively to first to sixth horizontal transfer stages 213-218, which are composed of shift registers such as CCD's. The charge signals from said horizontal transfer stages are converted into time-sequential signals by a vertical transfer stage 219. Said time-sequential signals contain the charge signals in the order of those from the photoelectric elements 207a, 208a, . . . , 212a positioned at the top of the photoelectric element arrays 207-212, then those from the photoelectric elements 207b, 208b, . . . , 212b positioned at the second in said arrays, then those from the elements 207c, 208c, . . . , 212c positioned at the third, and so on. These charge signals are supplied through a buffer amplifier 220 to a selecting circuit 221, which, in response to a signal indicating the position of the exit pupil of the objective lens received through an input terminal 221a samples and holds the charge signals from at least two photoelectric element arrays of which the positions of overlapping images of the photoelectric elements are closest to the position of said exit pupil of the mounted objective lens. Then said circuit adds thus held charge signals which are from the positionally corresponding photoelectric elements of the arrays and supplies thus obtained signals from an output terminal 221b. For instance, provided the positions of overlapping images of the photoelectric elements in the arrays 207 and 208 are closest to said exit pupil position, the circuit 221 samples and holds the charge signals from the photoelectric elements 207a, 208a, 207b, 208b, 207c, 208c . . . in the arrays 207 and 208 and respectively adds pairs of charge signals 207a and 208a, 207b and 208b, 207c and 208c, . . . , each paired charge signals being generated from the positionally corresponding photoelectric elements. In this manner it is rendered possible to select plural photoelectric element arrays of which the position of the images of the photoelectrical elements is close to the position of the exit pupil of the mounted objective lens and to synthesize the positionally corresponding signals of thus selected arrays. It is therefore possible to prevent the drawback resulting from the significant positional difference between the exit pupil and the overlapping images of the photoelectric elements, and at the same time to suppress the high spatial frequency components which are detrimental to the focus detecting operation.

As explained in the foregoing, in case there are provided plural lens arrays with different positions of the images of the photoelectric elements, it is possible to select, from said plural lens arrays, either only one array of which the image position is closest to the position of the exit pupil of the mounted objective lens, or to select only one lens array when the exit pupil of said objective lens is positioned in close proximity to the image position of the photoelectric elements of said one lens array and to select two lens arrays with the synthesis of the output signals therefrom in the above-described manner when the exit pupil of the objective lens is positioned in the middle of the image positions of said two lens arrays.

In the present invention the small lens is not limited to the convex lens illustrated in the foregoing embodiments but may be of any form having a positive refractive power.

"A focus detecting device" in this specification and claims involves not only a device for detecting the focus position of the image forming system but also a device for providing a measure of the distance between the device and a remote object.

I claim:

1. A focus detecting device for detecting the focus position of an image forming system, comprising:
   (1) plural arrays of small lenses, each of said arrays including plural small lenses arranged in a predetermined direction in the vicinity of a focal plane of said image forming system and said plural lens arrays being positioned mutually parallel;
   (2) plural photoelectric element means respectively corresponding to the small lenses of said lens arrays, each of said photoelectric element means being positioned behind a corresponding one of said small lenses; and
   (3) means for synthesizing photoelectric output signals from said photoelectric element means behind the positionally corresponding small lenses belonging to said plural lens arrays.

2. A focus detecting device according to claim 1, wherein each of said photoelectric element means is composed of a pair of photoelectric elements.

3. A focus detecting device according to claim 1, wherein at least one of said plural lens arrays is displaced in phase from another lens array.

4. A focus detecting device according to claim 1, wherein the number of said lens arrays is 2 to 6.

5. A focus detecting device according to claim 1, wherein said synthesizing means comprises a conductor mutually connecting the photoelectric element means positioned behind the positionally corresponding small lenses.

6. A focus detecting device according to claim 1, wherein said synthesizing means comprises adding means for adding the photoelectric output signals from the photoelectric element means positioned behind the positionally corresponding small lenses.

7. A focus detecting device according to claim 1, wherein the number of said lens arrays is at least three, said device further comprises means for selecting one of plural lens array groups, said group including at least one of said lens arrays and said synthesizing means is adapted to synthesize the photoelectric output signals of the lens arrays belonging to the thus selected group.

8. A focus detecting device for detecting the focus position of an image forming system, comprising:
   (1) a cylindrical lens array composed of plural cylindrical lenses arranged along a predetermined direction in the vicinity of a focal plane of said image forming system; and
   (2) plural photoelectric element means respectively positioned behind said cylindrical lenses, each of said photoelectric element means including a pair of photoelectric elements extending in the axial direction of said cylindrical lenses.

9. A focus detecting device for detecting the focus position of an image forming system, comprising:
   (1) plural arrays of small lenses, each of said arrays including plural small lenses arranged in a predetermined direction in the vicinity of a focal plane of said image forming system and said plural lens arrays being positioned mutually parallel;

(2) field lens means positioned in front of and close to said lens arrays; and (3) plural photoelectric element means respectively corresponding to the small lenses of said lens arrays, each of said photoelectric element means being positioned behind a corresponding one of said small lenses, and the position of images of the photoelectric element means of one of said plural lens arrays formed by the corresponding small lenses and by said field lens means being displaced in the axial direction of said optical system relative to that of images of the photoelectric element means of another of said plural lens arrays formed by the corresponding small lenses and by said field lens means.

10. A focus detecting device according to claim 9, wherein the positions of the photoelectric element means of said one and said another arrays with respect to the positions of the corresponding small lenses are gradually varied along the direction of arrangement thereof, and the amount of said variation is selected so as to be different between said one and said another lens arrays.

* * * * *

UNITED STATES PATENT AND TRADEMARK OFFICE
CERTIFICATE OF CORRECTION

PATENT NO. : 4,460,260
DATED : July 17, 1984
INVENTOR(S) : KEN UTAGAWA

It is certified that error appears in the above-identified patent and that said Letters Patent is hereby corrected as shown below:

Column 8, line 34, after "selected" insert --so as to be--.

Signed and Sealed this

Fourth Day of December 1984

[SEAL]

Attest:

GERALD J. MOSSINGHOFF

Attesting Officer

Commissioner of Patents and Trademarks